(12) United States Patent
Papakonstantinou et al.

(10) Patent No.: US 9,139,439 B2
(45) Date of Patent: Sep. 22, 2015

(54) PROCESS FOR THE PREPARATION OF GRAPHENE

(75) Inventors: Pagona Papakonstantinou, Newtownabbey (GB); Naigui Shang, Newtownabbey (GB)

(73) Assignee: UNIVERSITY OF ULSTER (GB)

( * ) Notice: Subject to any disclaimer, the term of this patent is extended or adjusted under 35 U.S.C. 154(b) by 0 days.

(21) Appl. No.: 14/002,399

(22) PCT Filed: Mar. 1, 2012

(86) PCT No.: PCT/GB2012/050466
§ 371 (c)(1),
(2), (4) Date: Oct. 31, 2013

(87) PCT Pub. No.: WO2012/117251
PCT Pub. Date: Sep. 7, 2012

(65) Prior Publication Data
US 2014/0044968 A1 Feb. 13, 2014

(30) Foreign Application Priority Data
Mar. 1, 2011 (GB) .................................. 1103499.8

(51) Int. Cl.
*C01B 31/04* (2006.01)
*B82Y 30/00* (2011.01)
*B82Y 40/00* (2011.01)

(52) U.S. Cl.
CPC ............ *C01B 31/0469* (2013.01); *B82Y 30/00* (2013.01); *B82Y 40/00* (2013.01); *C01B 31/0438* (2013.01); *C01B 2204/04* (2013.01); *C01B 2204/22* (2013.01); *C01B 2204/30* (2013.01); *C01B 2204/32* (2013.01); *Y10S 977/734* (2013.01); *Y10S 977/842* (2013.01); *Y10T 428/2982* (2015.01)

(58) Field of Classification Search
CPC .................... C01B 31/0438; C01B 31/0469
See application file for complete search history.

(56) References Cited

U.S. PATENT DOCUMENTS 7,824,651 B2 * 11/2010 Zhamu et al. .................. 423/448
8,795,899 B2 * 8/2014 Liu et al. .................... 429/231.8

FOREIGN PATENT DOCUMENTS

WO      2010/065346 A1     6/2010

OTHER PUBLICATIONS

PCT International Search Report of International Application No. PCT/GB2012/050466, dated Jul. 10, 2012.
Nuvoli et al., "High Concentration Few-layer Graphene Sheets Obtained by Liquid Phase Exfoliation of Graphite in Ionic Liquid", Dec. 20, 2010; Journal of Materials Chemistry Royal Society of Chemistry GBR, vol. 21, No. 10, pp. 3428-3431.
Zhou et al., "Dispersion of Liquid Graphene Sheets in Ionic Liquid (bmim)(PF6) Stabilized by an Ionic Liquid Polymer", Chemical Communications, 2010, 46, pp. 386-388.
Lu et al., "One-Pot Synthesis of Fluorescent Carbon Nanoribbons, Nanoparticles, and Graphene by the Exfoliation of Graphite in Ionic Liquids", ACS Nano, vol. 3, No. 8, pp. 2367-2375, Aug. 25, 2009.
Liu et al., "One-Step Ionic-Liquid-Assisted Electrochemical Synthesis of Ionic-Liquid-Functionalized Graphene Sheets Directly From Graphite", Advanced Functional Materials, vol. 18, No. 10, May 23, 2008.
"Ionic liquid," Wikipedia on-line encyclopedia entry located at URL http://en.wikipedia.org/wiki/Ionic_liquid, downloaded and printed on Feb. 20, 2015.
Eshetu, Gebrekidan et al., "Energy Storage Materials Synthesized from Ionic Liquids," Angewandte Reviews, Angew. Chem., Int. Ed. 2014, vol. 53, pp. 13342-13359.
International Preliminary Report on Patentability of PCT Application No. PCT/GB2012/050466 dated Sep. 3, 2013.

* cited by examiner

*Primary Examiner* — Stuart Hendrickson
(74) *Attorney, Agent, or Firm* — J.A. Lindeman & Co., PLLC (57) ABSTRACT

The present invention provides a process for the preparation of graphene or graphene-like fragments of another layered structure, said process comprising the step of mixing and grinding graphite or said other layered structure with at least one ionic liquid. The invention also provides the use of grinding in ionic liquids in such a process and products formed or formable by such methods.

15 Claims, 8 Drawing Sheets

Figure 1. Optical image of graphene sheet solutions.

Figure 2. XPS survey scan of graphene sheets (a) and starting graphite flakes(b); Narrow scan for elements C 1s (d) and O 1s (e) on the graphene sheets.

Figure 3. (a) and (b) Typical AFM image of single graphene sheets and nanodots; (b) and (d) Corresponding sectional analysis height data of (a) and (b), respectively, (e) the correlation between graphene size and grinding time.

Figure 4. (a) High resolution TEM image of single graphene sheets; (b) Corresponding electron diffraction pattern of (a).

Figure 5. Typical Raman spectrum of the graphene sheets.

Figure 6. TGA spectra of graphene sheets and starting materials.

Figure 7. The resistivity of graphene sheet films as a function of the annealing temperature.

Figure 8. (a) Low-magnification TEM image of graphene sheets; (b) Corresponding electron diffraction pattern of (a); (c) Size distribution of graphene sheets; HRTEM images of (d) bilayer, (e) triple layer and (f) 4 to 5 layer graphene sheets.

PROCESS FOR THE PREPARATION OF GRAPHENE

FIELD OF THE INVENTION

The present invention relates to processes for the preparation of graphene and graphene-like structures. In particular, the invention relates to processes for the preparation of graphene in the absence of redox reactants, and most particularly to physical methods of preparation. The invention also relates to the graphene produced by such processes and to the use of such processes in the preparation of graphene.

BACKGROUND

Graphene is a single atom thick planar sheet of $sp^2$-bonded carbon atoms which are positioned in a honeycomb crystal lattice. The term "graphene" is also used to represent structures having a small number of graphene layers and similar properties. The distinctive structure of graphene confers many unique mechanical, electronic, thermal, optical and magnetic properties upon it, in addition to quantum effects that have never been found in other materials. For example, the charge carriers in graphene behave as massless Dirac fermions and present an ambipolar field effect and room-temperature quantum Hall effect.

Graphene has remarkably high electron mobility, up to $2 \times 10^5$ $cm^2V^{-1}s^{-1}$ at room temperature. This is due to the ease with which electrons can move through the lattice, it being free of imperfections and heteroatoms. Its thermal conductivity is also remarkably elevated and was recently measured as high as 3000 $wm^{-1}k^{-1}$, larger than those measured for carbon nanotubes and diamond. This combination of properties makes graphene a promising candidate to take the place of Si as a new generation of materials in the semiconductor industry. Graphene may also have widespread potential applications in electronics and optoelectronics such as field-effect transistors, light-emitting diodes, solar cells, sensors and panel displays.

It has been both theoretically predicted and experimentally proved, that size, composition and edge geometry of graphene are important factors, which determine its overall electronic, magnetic, and optical and catalytic properties due to strong quantum confinement and edge effects. For example, by cutting graphene sheets to long and narrow ribbons (GNR) (width less than 10 nm) it is possible to induce a direct band gap in graphene, that renders GNRs semiconducting (M. Y. Han, et al. Phys. Rev. Lett., 2007, 98, 206805-2066808). Further confinement in the basal plane (overall dimensions smaller than 100 nm) leads to quantum dots (GQDs) with zero dimensions. The suppressed hyperfine interaction and weak spin-orbit coupling make GQDs interesting candidates for spin qubits with long coherence times for future quantum information technology (A. Donarini, et al. Nano Lett., 2009, 9, 2897-2902.). Therefore graphene sheets with reduced lateral dimensions in the form of nanoribbons or quantum dots can effectively tune the bandgap of graphene and facilitate the lateral scaling of graphene in nanoelectronic devices. In this context it has become urgent to develop effective routes for tailoring the graphene structures (J. Lu, et al. Nat Nanotechnol. 2011, 6, 247-252, L. A Ponomarenko, et al. Science, 2008, 320, 356-358).

Currently, there are a number of possible methods by which graphene sheets may be fabricated, which include chemical vapour deposition (CVD), micromechanical cleavage, epitaxial growth and chemical exfoliation. Compared with other techniques, chemical exfoliation, which involves the direct exfoliation of various solid starting materials, such as graphite oxide, expanded graphite and natural graphite, is advantageous in terms of simplicity, cost and high volume production. However, currently explored chemical solution exfoliation methods have a number of drawbacks that need to be addressed.

The most commonly used chemical exfoliation method employs the chemical oxidation of graphite to negatively charged graphite oxide sheets, which can be readily exfoliated as individual graphene oxide sheets by ultrasonication in water. To restore graphene's unique properties the oxygen containing groups are removed by chemical reduction; however without the charges, the strong Van der Waals interactions among the reduced graphene sheets result in their immediate coalescence and restacking. Very recently it was found that the addition of ammonia in the aqueous solution can lead to stable aqueous dispersions of graphene because of the electrostatic repulsion from the negatively charged carboxylic acid groups that remain on the surface of the sheets. Other attempts to prevent graphene aggregation have mainly focused on coating the graphene oxide surface with a dispersant phase, usually a surfactant or a polymer resulting in weak internanosheet repulsions.

The addition of foreign molecules to graphene is, however, undesirable for many applications and leads to the graphene produced by these chemical exfoliation methods being quite poor in quality compared to that fabricated by CVD and micromechanical cleavage. This is mainly because the various chemicals used, such as solvents, oxidants and reductants may attack the graphene lattice in the process or are difficult to be removed, leading inevitably to residual surface species. Overall these chemical processes introduce various forms of surface defects, which disrupt the graphene band structure and hamper the conductivity of the resulting graphene sheets. New strategies to produce relatively clean graphene sheets in bulk quantity while keeping them individually separated are required Another disadvantage of the known chemical exfoliation methods is that many of the chemicals used are either expensive or toxic and need careful handling, leading to environmentally unfriendly and unsustainable approaches. Furthermore, the majority of chemical solution exfoliation methods involve extremely time-consuming multiple steps that sometimes last for several days. For example, the oxide defects present in graphene oxide can be removed by thermal, or a combination of chemical and thermal, reduction which adds another step in the processing procedure. In addition, thermal reduction is most successfully carried out at ~1000° C., a temperature which is unsuitable for many applications.

Alternative processes, which overcome the above mentioned obstacles, and allow for the formation of high-quality graphene, have therefore been investigated. To date, some progress has been achieved.

Recently Coleman and co-workers from Trinity College Dublin demonstrated (Nature Nanotechnology 3 563, 2008) that it is possible to exfoliate graphite to produce single- and few layer graphene by judiciously choosing a solvent which ensures a strong interaction between solvent and graphene surface. However the yield of this process is small and not appropriate for mass scale production. Direct exfoliation of graphene in organic solutions improves the yield, but this is achieved only following prolonged sonication times approaching 3 weeks in duration or extended ultracentrifugation.

Liu et al. reported in Chem. Commun., 2010, 46, 2844-2846, that single layered and bilayered graphene sheets can be produced by a direct exfoliation from graphite flakes in the presence of single stranded DNA using a simple sonication. Production of graphene sheets from graphite by sonication in ionic liquids has also been reported by Wang et al. (Chem Commun., 2010, 46, 2844-2846), Nuvoli et al. (J. Mater. Chem., 2010) and in WO 2010/065346. However, the graphene sheets produced by these simple techniques still contain a few impurities (such as fluorine, sulphur etc.), and a large fraction of oxygen (more than 10 at %) similar to that found in graphene reduced from graphene oxide. Oxygen in graphene is difficult to be removed and may significantly influence the property and application of graphene. Thus, an alternative process capable of making graphene sheets of high quality and high concentration is highly desirable for high volume production.

There remains, therefore, a need for new solution-phase methods to produce significant quantities of high quality (low in defects or defect free, and/or unoxidized or substantially non-functionalised) graphene. In particular, new processes which possess improvements in cost and efficiency and/or which are capable of producing graphene of higher quality or in higher yields than those known in the art are needed. Improvement in multiple factors is desirable. Ultimately, a commercial process which can be used to make graphene on a large scale is desired. The present inventors have surprisingly established that the production of high quality graphene is possible using a processes involving the mixing and grinding of natural graphite with one or more ionic liquids. The use of natural graphite can not only decrease the cost compared to the expanded graphite or graphene oxide, but also improve the quality of resulting graphene due to the low oxygen content. Such processes can produce graphene in higher yields than was previously possible and hence represent promising alternatives to those already known in the art. In particular, the processes of the invention address the issue of providing solvent free, low impurity graphene and may be suitable for use on a large scale. Furthermore, the use of ionic liquids is potentially less expensive and more environmentally acceptable than the previously developed alternatives.

SUMMARY OF THE INVENTION

The present invention relates to the development by the inventors of new processes for making graphene.

Viewed from a first aspect the invention thus provides a process for the preparation of graphene, said process comprising the steps of mixing and grinding graphite with at least one ionic liquid. Optionally and preferably, the process of the invention does not comprise a sonication step.

Viewed from another aspect, the invention provides a process as herein defined, wherein the graphene is in the form of graphene nanosheets or graphene nanodots.

Viewed from another aspect, the invention provides apparatus for use in a process as hereinbefore defined, comprising a grinding mechanism which is in contact with graphite and one or more ionic liquids.

Viewed from another aspect, the invention provides for the use of grinding graphite in one or more ionic liquids in the formation of graphene.

Viewed from another aspect, the invention provides the graphene formed by or formable by the processes as hereinbefore described.

Viewed from another aspect, the invention provides a graphene nanodot having a height of 1 to 3 nm. Optionally, and preferably, these graphene nanodots have a diameter of less than 10 nm. The graphene nanodots of the invention may be formed by or formable by a process as hereinbefore described.

DETAILED DESCRIPTION OF THE INVENTION

The present invention relates to processes for the preparation of graphene, the graphene produced therefrom and apparatus suitable for carrying out such processes. The term "graphene" is used herein to refer to a single atom thick planar sheet of $sp^2$-bonded carbon atoms which are positioned in a honeycomb crystal lattice. In the context of the present invention, the term "graphene" is also intended to refer to more than one, but not more than 10, of these single sheets arranged in a layered structure. Preferred numbers of layers will thus be 1 to 10, preferably 1 to 8, more preferably 1 to 5 (e.g. 2 to 10 or 2 to 5). Where the graphene, whether it be a single sheet or multiple sheets arranged in a layered structure, has a surface area of more than 0.005 $\mu m^2$ (e.g. more than 0.08 $\mu m^2$), preferably 0.006 to 0.038 $\mu m^2$ (which may be 0.5 $\mu m^2$ (e.g. 0.45 $\mu m^2$) or greater), the graphene may be referred to as being in the form of "nanosheets" in the context of the invention. If, however, the surface area of the graphene is lower, it may be referred to as being in the form of "nanodots" (e.g. having a surface area of less than 0.5 $\mu m^2$, such as less than 0.08 $\mu m^2$). In the context of the invention, the term "nanodot" is used to refer to a single sheet of graphene, or multiple layers thereof, which has a diameter of less than 20 nm, for example 10 nm or less.

The term "graphite" is well known to the man skilled in the art and is used herein to convey its traditional meaning of a layered planar structure, each layer comprising a sheet of $sp^2$-bonded carbon atoms. Graphite as referred to herein has at least 11 layers of this hexagonal carbon, which are held together by weak Van der Waals forces. In all embodiments of the present invention, the graphite may be of any type from any source but it is preferable that the graphite is natural graphite, i.e. the unprocessed material.

The processes of the invention comprise the steps of mixing and grinding graphite with at least one ionic liquid. The graphite can take any form but is preferably natural graphite. The use of natural graphite as a starting material not only helps to decrease the cost of the processes of the invention compared to others known in the art, which use expanded graphite or graphene oxide, but also helps to minimise the presence of oxygen-containing groups in the final product.

The relative ease at which ionic liquids can be separated from other materials render the processes of the invention well suited to continuous operation.

In all embodiments of the present invention, the process may include an additional step of removing the ionic liquid. This may be by any suitable method, preferably by using one or more solvents. Preferably the solvent is a polar solvent such as Dimethylformamide (DMF) or acetone. In one embodiment, the solvent is a mixture of DMF and acetone. The process may further involve an additional step of separating and optionally recovering solvent. The solvent may then be recycled (or partially recycled) and utilised in a batch or continuous process. This minimises both the cost and environmental impact of the processes of the invention, rendering them suitable for large scale production of graphene. The process of the invention may thus be a batch process or a continuous process, although a continuous process is preferred, especially on a larger scale.

The processes of the present invention, in all embodiments, preferably do not comprise a sonication step. Sonication methods are well known in the art and in the context of the production of graphene are associated with prolonged reaction times and high energy input. Sonication methods are thus poorly suited to large scale and/or commercial production. To the extent that any sonication may be used, this will preferably be, for example, sonication for a period of no more than 60 minutes. This is in contrast to previous methods which use sonication for many days.

The grinding aspect of the process of the invention may take place by any grinding method known in the art. Preferably, the mixing and grinding in the process of the current invention occur simultaneously, although it is also possible for one to precede the other. In all embodiments, the total time during which the graphite and the one or more ionic liquids are mixed and ground is in the range of 0.1 to 4 hours (e.g. 0.3 to 4), preferably 10 minutes to 2 hours (e.g. 0.5 to 2) hours. Manual grinding with a mortal and pestle for 1 hour or less (e.g. for 30 minutes or less, such as 10 to 30 minutes) typically produces graphene nanosheets. Grinding for more than 30 minutes, especially more than one hour (e.g. 2-4 hours) produces increased amounts of graphene nanodots. Nanodots will typically have a diameter of less than 40 nm, such as an average diameter of 35 nm or less. This will reduce on further grinding. The thickness of a graphene nanodot of the invention may be an average of less than 20 nm (e.g. 16 nm or less). This also will reduce with further grinding and may typically be less than 5 nm or less than 1 nm as the grinding time increases. Grinding of up to around 4 hours (e.g. 30 min to 4 hours) may typically be used for nanodots. Alternatively one can employ planetary or ball milling, pressurized fluid milling, and air jet milling in a liquid mixture. Mechanical grinding methods allow the use of greater energy in grinding and so the skilled worker will appreciate that shorter grinding times may be appropriate. These will be optimised by routine methods.

In all aspects, the process of the invention preferably produces graphene in yields of at least 10 wt %, preferably at least 15 wt % or at least 20 wt % relative to the weight of graphite starting material.

One aspect of the invention involves the use of grinding in one or more ionic liquids in the formation of graphene. Preferably the grinding will be of a graphite starting material. In such uses, the graphene may be generated by any of the processes as hereinbefore described.

The process of the invention may be carried out using any suitable form of apparatus which comprises a grinding mechanism which is in contact with graphite and one or more ionic liquids. Typical grinding mechanisms would be well known to the skilled worker and include, for example grinding with a mortar and pestle, ball milling, planar milling, pressurized fluid milling, and air jet milling in a liquid mixture. In all embodiments, the mixing and grinding stages of the process of the invention may be carried out in a single vessel or multiple vessels. For example, the graphite and the one or more ionic liquids may be mixed in a first vessel and then transferred to a second vessel for grinding. In one preferred aspect, the graphite will be mixed and ground with an ionic liquid, and subsequently the ionic liquid will be removed by centrifugation in a solvent (such as a mixture of DMF and acetone). Further separation steps such as further centrifugation in other solvents or mixtures (e.g in DMF only) may follow. The solvent such as DMF may be separated for optional re-use and the graphene may be separated in a continuous process. Similarly, the graphite may be fed to one or more grinding stations concurrently with some or all of the ionic fluid and passed in a continuous process through further optional grinding stations as desired and then to a separator for removal of the ionic fluid. Variants of this process will be evident to those skilled in the art. In all processes of the invention the remaining graphite starting material may be sepatated from the graphene product. After separation the remaining graphite may be "recycled" by re-use in the process of the invention.

The process of the present invention can be used to generate very high quality graphene having a low level of organic solvent and/or relatively low levels of both covalent and non-covalently bound impurities. This may be achieved and/or improved by conducting the process in the substantial absence of redox reagents. In one embodiment, all aspects of the invention may be conducted in the absence of any oxidising agent. Similarly, in a further embodiment, all aspects of the invention may be conducted in the absence of any reducing agent. In this context an oxidising agent will evidently be an agent capable of oxidising a carbon-carbon bond such as those in graphene and a reducing agent will be one capable of reducing a carbon-heteroatom bond such as a carbon-oxygen bond (e.g. in graphene oxide).

In all embodiments of the invention, the graphene may be in any form, although it is preferred if it is in the form of graphene nanosheets or graphene nanodots.

Where the graphene is in the form of nanosheets, these may comprise multiple layers. A preferred number of layers is in the range of less than 10, more preferably 1 to 5. A highly preferred number of layers is 2.

Where the graphene is in the form of nanodots, these are preferably substantially uniform. In all embodiments of the invention, the diameter of the nanodots is preferably in the range of less than 20 nm, more preferably less than 10 nm. The nanodots of the invention preferably have a height of between 1 and 3 nm.

Without being bound by theory, it is thought that varying the grinding time and volume of ionic liquid used in the process of the current invention allows for a degree of control over the properties of the graphene produced therefrom. Longer grinding times, such as those greater than 1 hour, and lower volumes of ionic liquid, e.g. less than 0.3 mL per 50 mg of graphite are associated with a higher prevalence of graphene in the form of nanodots. Shorter grinding times, such as those of less than hour, and higher volumes of ionic liquid, e.g. 0.4 mL or greater per 50 mg of graphite, lead to the predominant formation of graphene nanosheets.

The oxygen content of the graphene produced by the process of the invention is preferably less than 5 at %, more preferably less than 4 at %, even more preferably less than 3 at %. Without being bound by theory, it is thought that any oxygen present in the graphene produced by the process of the current invention is a result of pre-existing oxygen present in the graphite starting material and has not incorporated during the mixing and grinding process.

Notwithstanding the presence of oxygen, it is preferable in the graphene produced by the process of the invention is substantially free of other contaminants, including those which are chemically bound to the graphene. In particular, contaminants such as fluorine, nitrogen, phosphorus and sulphur are preferably substantially absent from the graphene produced. Herein by "substantially absent" is indicated a level of impurity around or below the detection limit of X-ray photoelectron spectroscopy (XPS). Typically, such a level will be less than 1 at %, being the practical resolution limit of XPS. The absence of such impurities means that the process of the invention offers an improvement in quality over other (e.g. chemical) methods known in the art for the production of graphene. The graphene resulting from the process of the invention is also preferably free or substantially free from structural defects.

The processes of the invention all involve, as a key step, the mixing and grinding of graphite with at least one, preferably only one, ionic liquid.

Ionic liquids are well known in the art to be organic or partially inorganic salts which are liquids at temperatures below 100° C. and which comprise solely (or largely) ions and/or short-lived ion pairs. They have a wide range of attractive properties such as low volatility and low flammability, in addition to possessing favourable solvating properties for a number of polar and non-polar compounds. Without being bound by theory, ionic liquids are believed particularly well suited to the process of the invention because their surface tension is similar to the surface energy of graphite. Furthermore, their ionic nature means that they are believed to be capable of stabilising graphene via Coulombic interactions.

Any known type of ionic liquid in the art is suitable for use in the processes of the current invention. Particular preferred ionic liquids are those which comprise an organic salt, wherein the organic salt contains one or more cations selected from the group consisting of ammonium, imidazolium and pyridinium ions. A preferred organic salt is one containing an imidazolium ion. A highly preferred ionic liquid is 1-butyl-3-methyl-imidazolium hexafluorophosphate, $BMIMPF_6$, The graphene produced by the process of the invention is suitable for use in any application currently known in the art to employ graphene. In particular, it is well suited for use in the preparation of composites or transparent films. Alternatively, it could be mixed with an appropriate ink material for ink jet printing in electronics and energy applications. Graphene conductive inks can be used in the manufacture of conductive elements in printed circuits and sensor electrodes. Other major markets for conductive inks include displays, radiofrequency identification, photovoltaics, lighting, disposable electronics and memory sensors as well as traditional thick film applications in which screen printing is used in the creation of printed circuit boards, automobile heaters and electromagnetic interference shielding etc.

ILs are low-temperature molten salts, and as their name denotes are liquids composed entirely of ions. They have been proposed as a new class of "green" organic solvents because not only they are able to solvate a large variety of organic and inorganic compounds, (polar or non-polar) but also they possess high thermal and chemical stability, high ionic conductivity, wide electrochemical window, and negligible vapour pressure. The mixing of a small quantity of IL and graphite flakes forms a gel-like composite. When graphite flakes are ground with ionic liquids, the shear force detaches the graphene layers from the graphite flakes. The ionic liquids can effectively surround each layer preventing the detached graphenes from restacking. Based on simulation and experimental studies on processing of carbon nanotubes with imidazolium-based ILs, the electronic structure of graphene layers in the bucky gel remains unchanged and there is no charge transfer between graphene and imidazolium cations.

A further advantageous application of the graphene nanodots of the present invention is in the formation of fluorescent graphene nanodots, for example for use in bioimaging applications. Such fluorescent graphene nanodots may be formed from the nanodots of the present invention (e.g those produced by any method of the invention) by subjecting the nanodots to an oxidising procedure. The processes of the present invention, especially those producing nanodots may therefore comprise the additional step of oxidising the graphene product, preferably to provide fluorescent graphene nanodots.

It will be evident to those of skill in the art that the present method of mechanical exfoliation in the presence of an ionic liquid will be applicable to the formation of other "2D" type structures in addition to the formation of graphene. Exfoliation of other layered materials is known in the relevant art (e.g. Coleman et al. Science 331 (2011) p 568-571) and any layered material may effectively be used in place of graphite in all aspects of the present invention so as to provide thin flakes and/or nanodots of the corresponding material. By "layered material" is indicated any material having strong bonding interactions (e.g. covalent bonds) between atoms within layers of a structure and having weaker (e.g. non-covalent, such as columbic and van-de-Waals) interactions between layers. Many materials are known in the art to adopt such a structure including graphite, transition metal dichalcogenides (TMD's), transition metal oxides (TMOs) and others including BN, $Bi_2Te_3$ and $Bi_2Se_3$. Preferred layered materials include graphite, $MoS_2$, $WS_2$, $MoSe_2$, $MoTe_2$, $TaSe_2$, $NbSe_2$, $NiTe_2$, BN, $Bi_2Se_3$ and $Bi_2Te_3$.

In a further aspect of the present invention, all references herein to "graphite" may thus be taken to indicate a layered structure as defined herein and any references to "graphene" may be taken to indicate "graphene like" single-layered or few-layered (e.g. 1 to 10 layers and as described herein for graphene) fragments of a corresponding material. Such fragments will typically be in forms corresponding to those described herein for graphene and all aspects of the invention are applicable to layered materials and the formation of the corresponding "graphene like structures" therefrom, as well as to corresponding uses and to the products formed and formable thereby. Any of the advantages such as high purity, structural integrity and ease of production may be applied equally to other structured materials making these directly analogous to the graphite and graphene described as the primary example of a layered structure herein.

It will be evident from the forgoing that, as used herein, the term "graphene like" indicates a substantially two-dimensional flake-like crystalline structure formed or formable from any of layered crystalline material, such as those described herein. This term is not limited to carbon lattices nor to hexagonal arrangements, although both of these form preferred embodiments.

EXAMPLES

Synthesis

Figure 1:
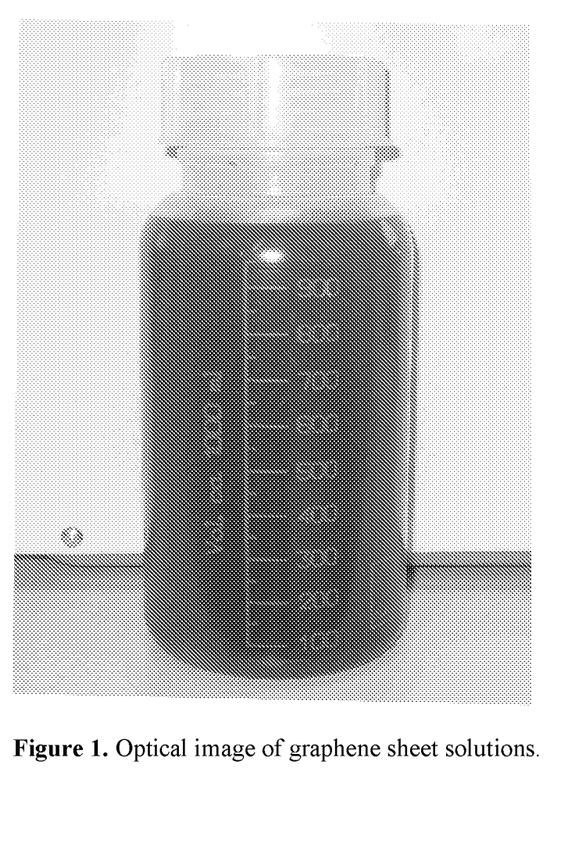
FIG. 1. Optical image of graphene sheet solutions.

Graphite powders of 50 mg (99.0% purity, from Sigma-Aldrich) with a size less than 20 μm (typically 50 mg) were mixed and ground with 0.1-0.5 mL ionic liquid (1-Butyl-3-methylimidazolium hexafluorophosphate, $BMIMPF_6$, from Sigma-Aldrich) for 0.5-4 hrs. Then the mixtures were added into a solution of 15 mL N,N-dimethylformamide (DMF) and 15 mL acetone and centrifugated in the speed of 3000 rpm for 30 min in order to remove the ionic liquid. After repeating this washing procedure for three times, the resulting sediment was diluted in 1 L DMF (see FIG. 1). After one-day sedimentation, the large/thick graphitic flakes completely precipitated on the bottom of the bottle. The supernatant was dried and then the yield was calculated as 20 wt %, which is much larger than that of other methods reported, such as by Coleman et al. in Nature Nanotechnology, 2008, 3, 563-568. The supernatant was collected and centrifugated to get the dense suspension, with which the graphene samples were prepared for the study of their microstructure and electrical properties. The suspension was diluted and dropped on lacy carbon coated Cu grid for the TEM observation, on clean Si wafers or mica sheets for the)(PS, Raman and AFM studies, and on the 300 nm $SiO_2$ coated Si wafer for the study of electrical properties. Note, to obtain uniform large-area graphene thin films, the 300 nm $SiO_2$ coated Si wafer was functionalized by 5% 3-Triethoxysilylpropylamine (APTES) aqueous solution for 30 min. All samples were completely dried under the infrared light or on the hot plate before measurements.

XPS Analysis

Figure 2:
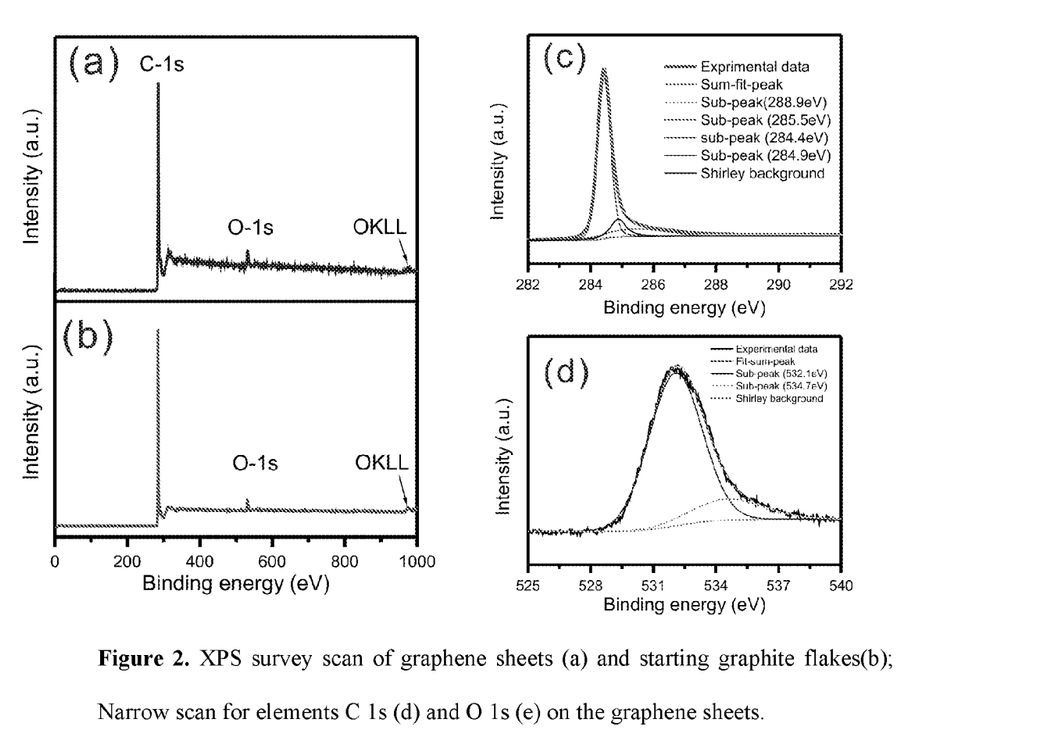
FIG. 2. XPS survey scan of graphene sheets (a) and starting graphite flakes (b); Narrow scan for elements C 1s (d) and O 1s (e) on the graphene sheets.

FIG. 2(a) shows a typical XPS survey scan spectrum of graphene nanosheets, showing a strong C 1s peak at 284.5 eV, a small O 1s peak at 532.6 eV and a weak O KLL Auger band between 955-985 eV. Except for some oxygen and carbon from the graphene sheets, no other elements such as F, N and P from either the ionic liquid or DMF are found in the sample. The concentration of elements C and O in the sample is calculated to be about 96.55 and 3.4 at %, respectively. It should be noted that the presence of a 3.4 at % of oxygen in the graphene product originates from the starting graphite flake powder (FIG. 2b) used and is not a product of the process. FIGS. 2(c) and (d) present a high resolution asymmetric C 1s and an O 1s) XPS spectrum of graphene sheets, respectively. After the subtraction of a Shirley background followed by fit using a mixture function of Lorentzian and Gaussian, the C 1s peak can be mainly deconvoluted into four sub-peaks at 284.4, 284.9, 285.5, and 288.9 eV, which have been assigned to C—C (sp2), "defect peak", C—O and COOC/COOH bonds, respectively, while the O is peak can be fitted by two Gaussian peaks at 532.1 and 534.7 eV corresponding to C—O and COOH bonds. This demonstrates that the graphene sheets are clean and free of any impurities and contaminations from the chemicals used, except for a small amount of oxygen, which has its origin in the starting graphite material.

Microscopic Analysis (HR-TEM and AFM)

Figure 3:
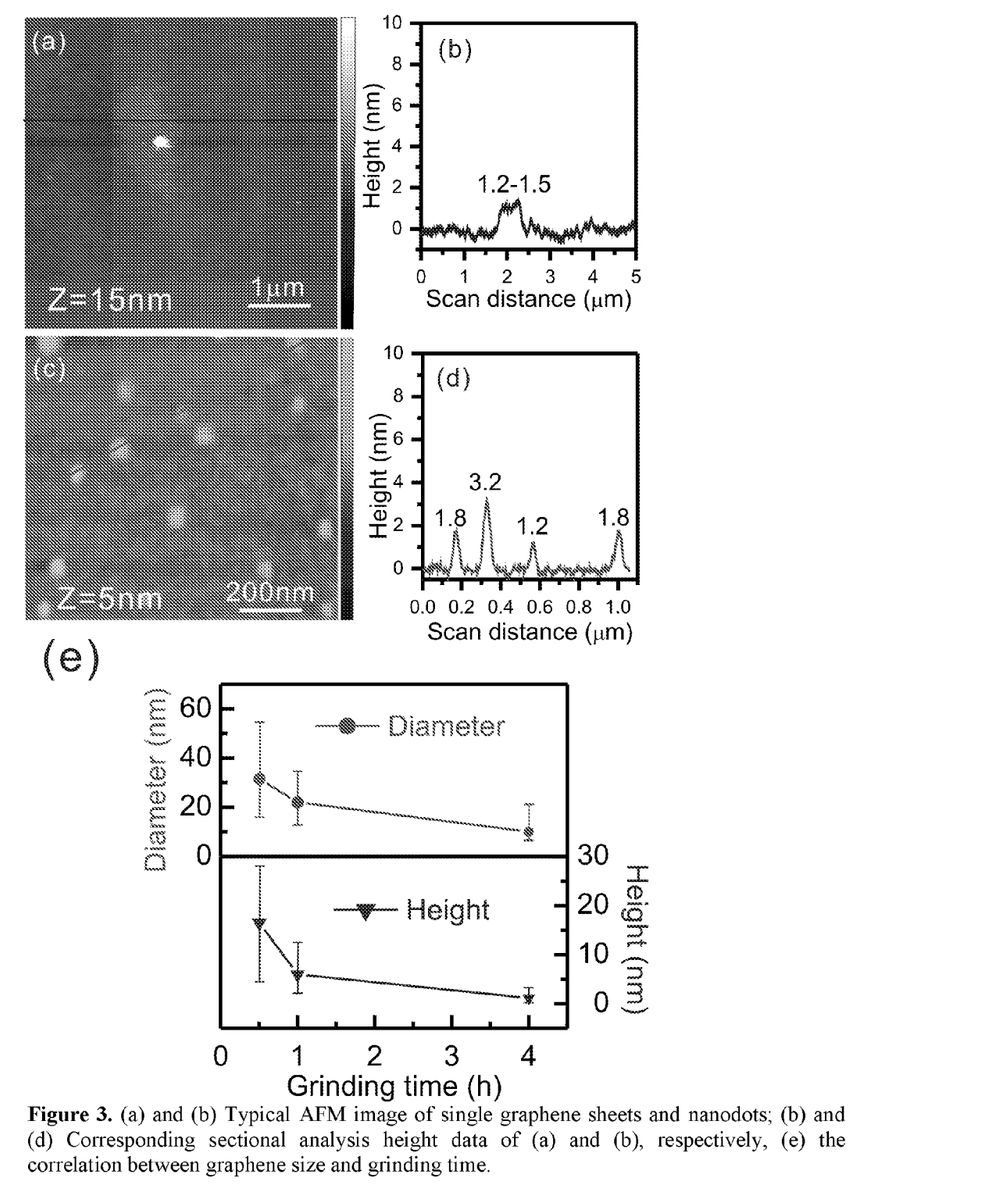
FIG. 3. (a) and (b) Typical AFM image of single graphene sheets and nanodots; (b) and (d) Corresponding sectional analysis height data of (a) and (b), respectively and (e) the correlation between graphene size and grinding time.
Figure 4:
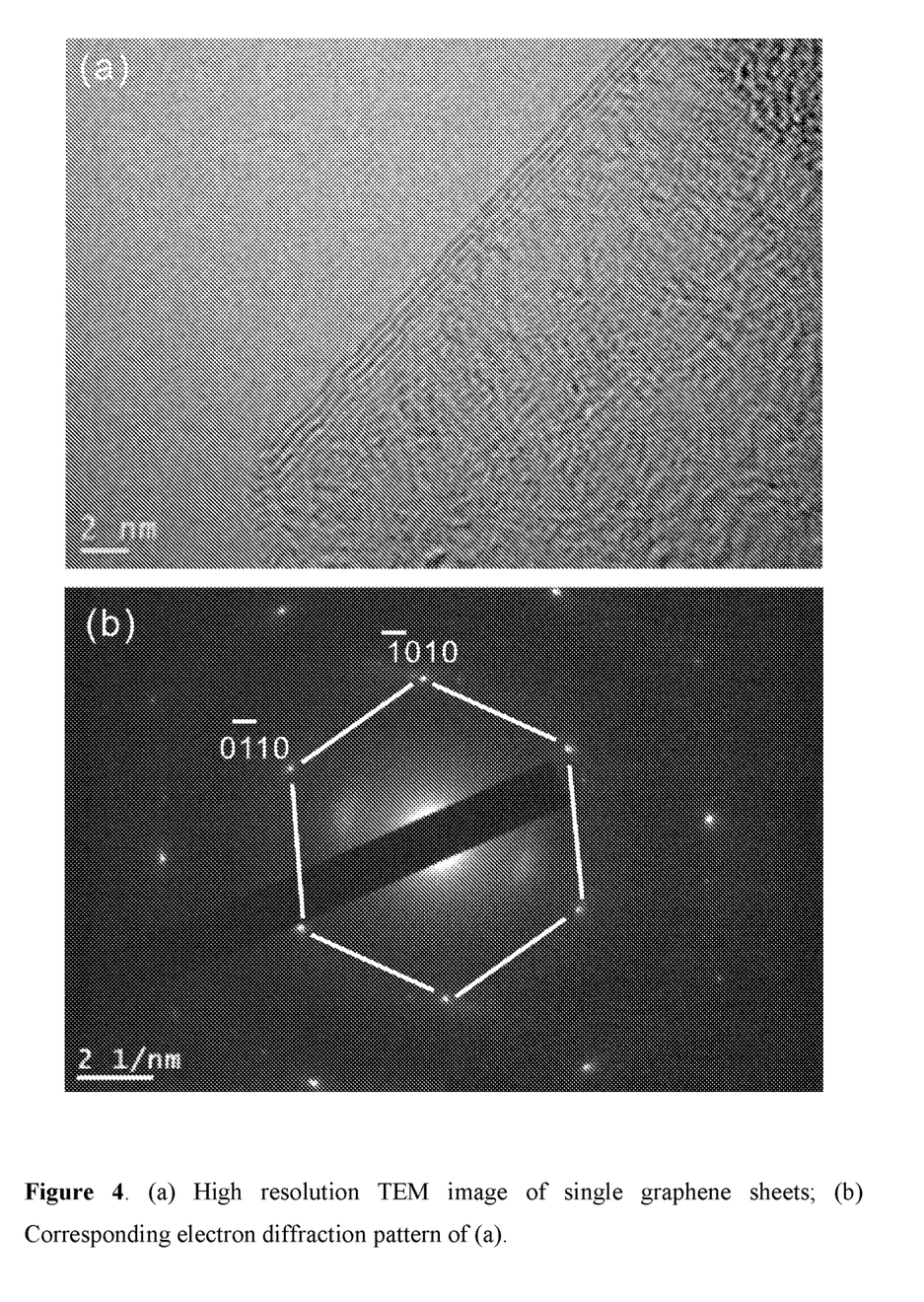
FIG. 4. (a) High resolution TEM image of single graphene sheets; (b) Corresponding electron diffraction pattern of (a).

Two kinds of graphene structures: a sub-micrometer few-layer sheet and a nanometre dot, can be formed in the supernatant by the present techniques, strongly dependent on the preparation parameters. FIG. 3a shows a typical AFM image of single submicrometer graphene sheets, which are dominant in the supernatant when a shorter grinding time (<30 min) and a large quantity of ionic liquid are applied (0.5 mL). The AFM measurements are performed in a tapping mode. The graphene sheet is flat with slightly bended edges. The graphene sheet has a dimension of around $0.6 \times 1.5$ $\mu m^2$ and a thickness of 1.2-1.5 nm (FIG. 3c), which is a typical height of bilayer graphene. FIG. 3b shows a typical AFM image of nanometer sized dots, which are dominant in the supernatant when a longer grinding time (>1 hour) and lower quantity of ionic liquid are applied (<0.5 mL). The graphene nanodots are uniform with a diameter of 20-40 nm and a height of 1-3 nm (FIG. 3d). By taking into account the "broadening" effect of AFM tips in the lateral dimension and spherical feature of a nanodot, the actual diameter of such graphene nanodots is believed to be less than 5 nm. FIG. 4 shows a typical high resolution TEM image of single graphene sheets. It can be seen that the graphene sheets are made of 3-4 layers of graphene with a lattice spacing of 0.342 nm. No other carbon phases such as amorphous carbon and fullerene etc. were found on the edge of graphene sheets. The corresponding electron diffraction pattern has a typical six-fold symmetry, confirming that the graphene sheet is of high quality single crystal nature. Therefore these findings definitely show that few layer graphene sheets of high quality are produced by this simple method.

Raman Scattering

Figure 5:
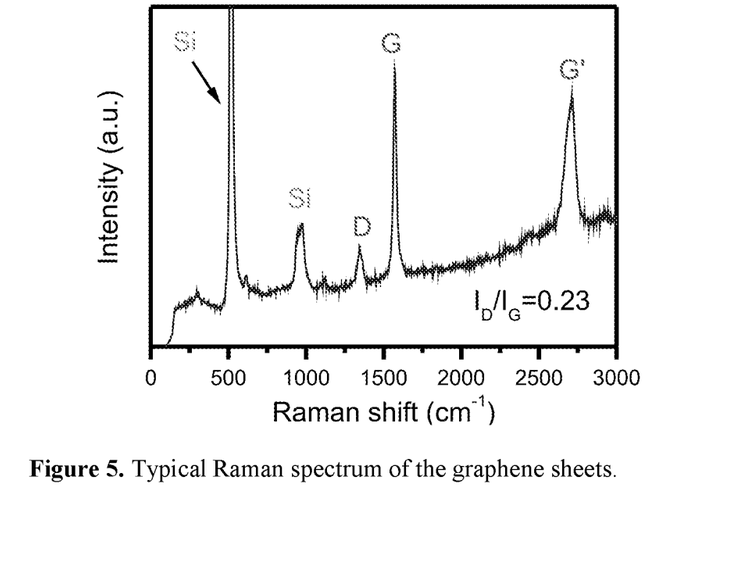
FIG. 5. Typical Raman spectrum of the graphene sheets.

Raman scattering is a convenient, powerful macroscopic tool for the characterization of graphene. The layer number and quality of graphene fabricated by the method of micromechanical cleavage can be well distinguished by the analysis of spectroscopic intensity, frequency and line width etc. FIG. 5 shows a typical Raman spectrum of the graphene sample. The Raman measurement was conducted in a back-scattering geometry at room temperature using an excitation of 514 nm laser with a spot size of 1-2 μm. There are three strong peaks at 1348, 1571, and 2711 $cm^{-1}$, which are ascribed to the D, G, and G' bands of graphitic materials, respectively. No broad peaks relevant to amorphous carbon are found in the sample. The presence of the D peak can be attributed to the small sizes of graphene sheets compared to the laser spot (1-2 μm), which probed defects on the edges of graphene sheets. The ratio of integrated intensities of D to G bands is only 0.23, revealing that the graphene produced is of high quality as the D band is a fingerprint of defects in graphitic materials. The G' band, a fingerprint of graphene, is quite strong, larger than the D and but slightly smaller than the G band in intensity. The ratio of integrated intensity of G' to G bands is about 0.61, revealing the existence of 3-4 layers of the graphene, consistent with the TEM observation. Note, currently the Raman spectra of graphene fabricated by solution based methods do not resemble those of graphenes produced by other methods. They do not present very identical spectroscopic features due to the sensitivity to chemicals and are strongly dependent on the fabrication method and chemicals used. However, all findings presented here can confirm that the crystalline quality of graphene we produced is better than that of graphene reported by solution methods in other groups, such as that of Qian et al., Nano Res., 2009, 2, 706-712, however poorer than that of graphenes produced by the mechanical cleavage method of highly oriented pyrolytic graphite (HOPG) and by the high-temperature CVD method on the metal substrate, where no defect related D bands can be detected. The relatively poorer quality of graphene sheets is believed to be due to the low-quality starting material (natural graphite) compared to the HOPG, and not due the grinding process.

Thermogravimetric Analysis

Figure 6:
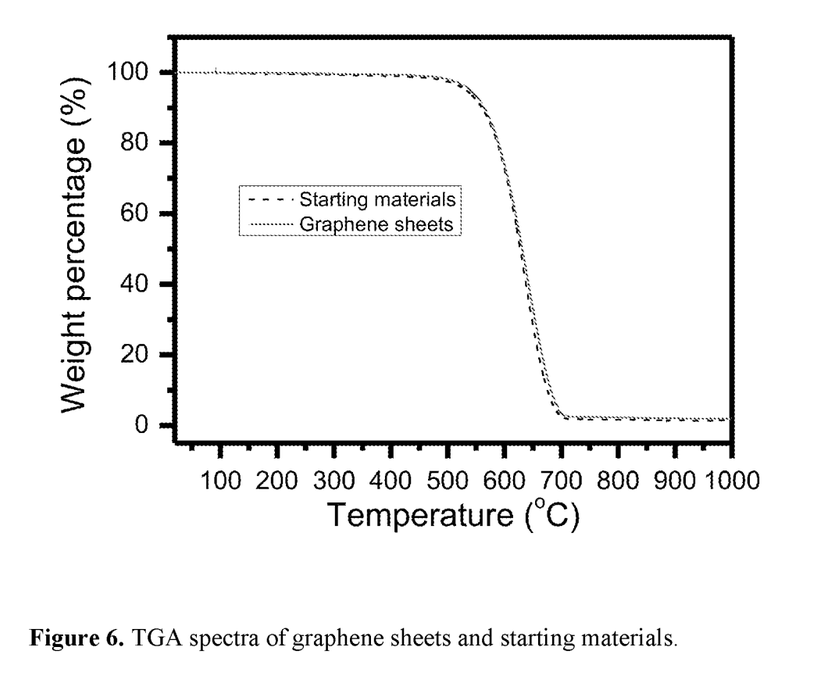
FIG. 6. TGA spectra of graphene sheets and starting materials.

A lack of contaminants and structural defects was confirmed by a TGA method based on a bulk quantity (several mg scales) of graphene sheets and nanodots. FIG. 6 shows TGA spectra taken from the graphene sheets and the starting materials. The measurements were performed in a mixture ambient of 50% $N_2$ and 50% $O_2$ with a ramp of 1° C./min. It can be seen that graphene sheets exhibit almost identical thermal behaviour to that of the starting material. They simultaneously start to oxidize at around 500° C. and completely burn off at 700° C. This demonstrates an identical quality, indicating that no high/low melting materials have been introduced in the fabrication process.

Resistivity

Figure 7:
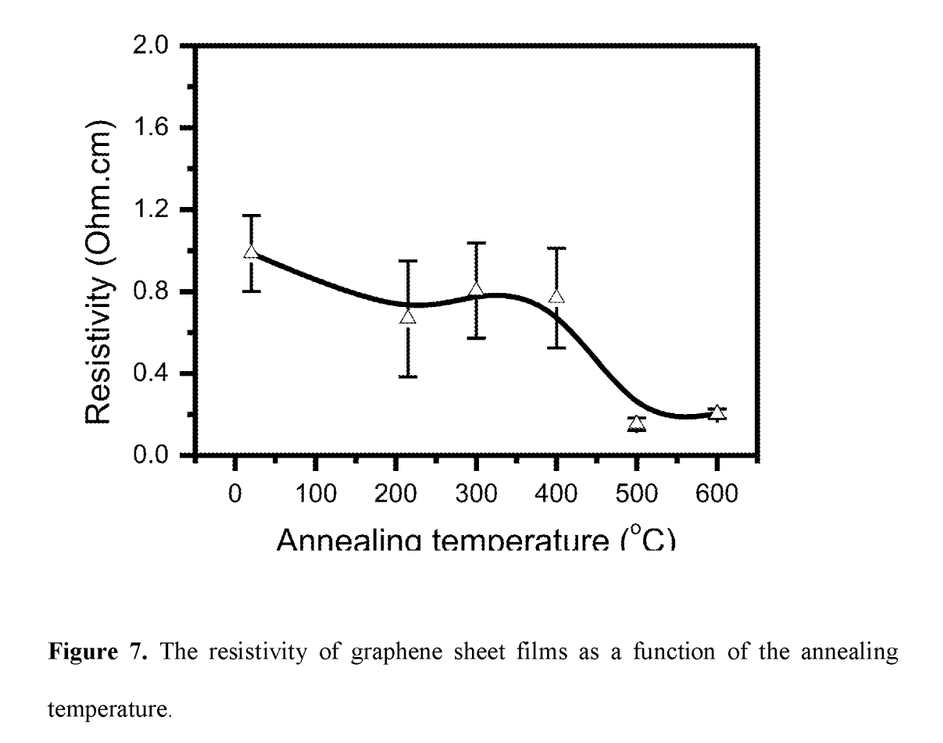
FIG. 7. The resistivity of graphene sheet films as a function of the annealing temperature.
Figure 8:
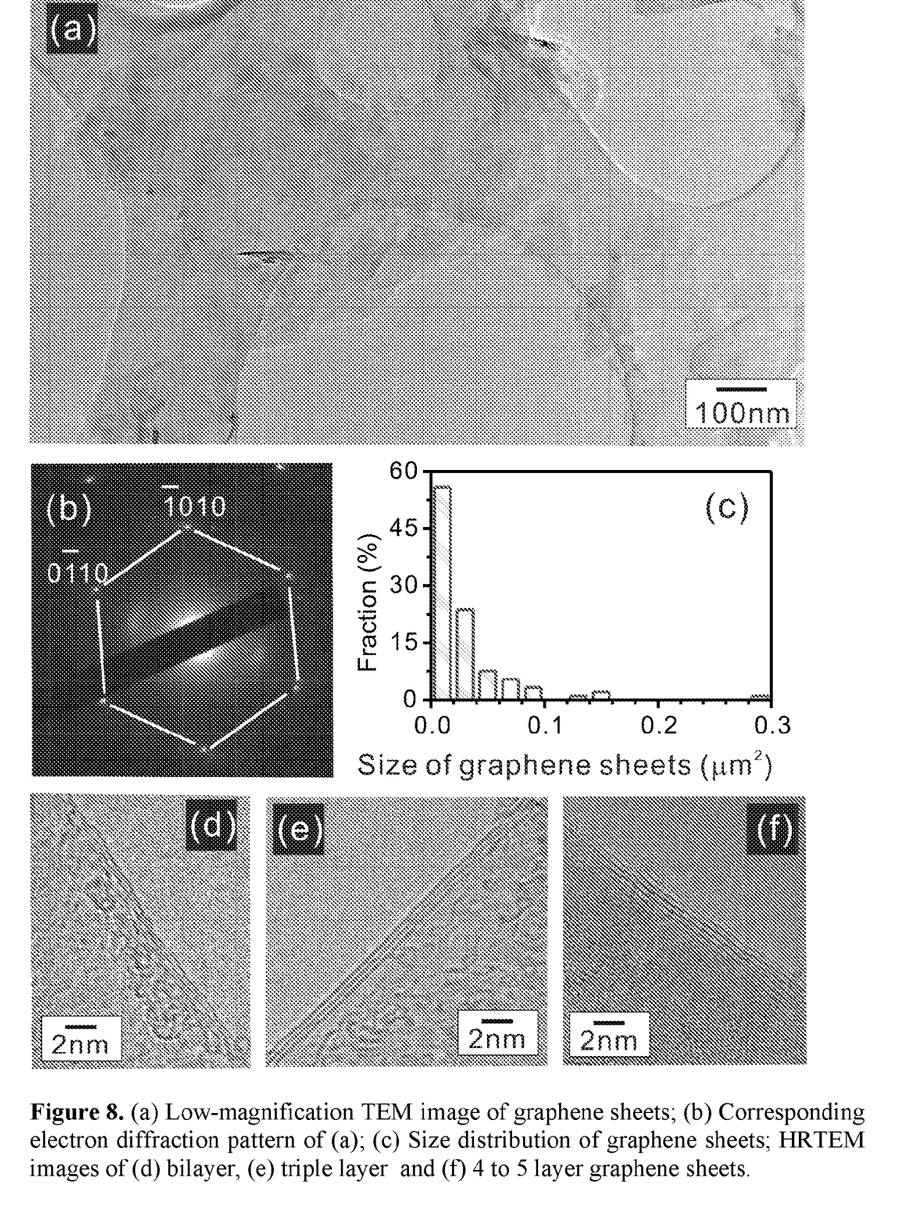
FIG. 8. (a) A typical low-magnification TEM image of graphene sheets; (b) Corresponding electron diffraction pattern of (a); (c) Size distribution of graphene sheets; HRTEM images of (d) bilayer, (e) triple layer and (f) 4 5 layer graphene sheets.

FIG. 7 shows the resistivity of graphene films as a function of the annealing temperature. The graphene films with a thickness of around 12.8 μm were fabricated on a large $SiO_2$ coated Si wafer by drop coating and then were cut into several 10×20 $mm^2$ sized pieces for annealing in vacuum (less than $8×10^{-5}$ Torr) for 1 hr in the temperature range of 200-600° C. The resistances were measured by a four-probe technique at room temperature (Resistivity test rig, Model B, A & M Fell LTD, England). The resistivity of pristine graphene films is about 1×10–2Ω·m. The resistivity decreases to 8×10–3Ω·m with the increase of the annealing temperature in the range of 200-400° C. When the annealing temperature is increased to 500-600° C., their resistivity significantly lowers to 2×10–3Ω·m. However, this value is still larger than that of graphene films produced by other chemical solution methods (0.07–0.11×10–3Ω·m). The main reason for this is that there are a lot of junctions in the film due to either the smaller size of single graphene sheets or the presence of plenty of voids. The standard deviations of pristine and annealed graphene films at low temperatures are quite large, demonstrating that the graphene film could have different thicknesses and the presence of a number of structural voids in the inner. Obviously, the variation of the graphene resistivity takes place in two steps, revealing that the graphene film is subjected to two kinds of structural transitions during annealing. The first process is estimated to be due to the desorption of various absorbates such as water, C—H and COOH groups from the surface of graphene films and the inner surface of those structural voids. The second step could be ascribed to the shrinking or collapsing of the voids, leading to relocation of all constituent graphene sheets and the formation of a dense uniform film at high temperature, which is evidenced by the small value of standard deviations.

Synthesis of Other "Graphene Like" Materials

A powder of a material selected from $MoS_2$, $WS_2$, $MoSe_2$, $MoTe_2$, $TaSe_2$, $Nbe_2$, $NiTe_2$, BN, $Bi_2Se_3$ and $Bi_2Te_3$ (50 mg) with a size less than 20 μm (typically 50 mg) is mixed and ground with 0.1-0.5 mL ionic liquid (1-Butyl-3-methylimidazolium hexafluorophosphate, $BMIMPF_6$, from Sigma-Aldrich) for 0.5-4 hrs. Then the mixtures are added into a solution of 15 mL N,N-dimethylformamide (DMF) and 15 mL acetone and centrifugated in the speed of 3000 rpm for 30 min in order to remove the ionic liquid. After repeating this washing procedure for three times, the resulting sediment is diluted in 1 L DMF. After one-day sedimentation, the large/thick flakes of remaining starting material are completely precipitated on the bottom of the bottle. The supernatant is dried and then the yield is calculated. The supernatant is collected and centrifugated to get the dense suspension, from which the "graphene like" samples are prepared for use or further study.

The invention claimed is:

1. A process for the preparation of graphene or graphene-like fragments of another layered structure, said process comprising the step of mixing and grinding graphite or said other layered structure with at least one ionic liquid, wherein the process does not comprise a sonication step.

2. A process of claim 1 having a yield of at least one of graphene nanosheets and graphene nanodots of greater than 10% relative to the starting weight of the graphite or other layered material.

3. A process as claimed in claim 1, wherein mixing and grinding occurs for a time period of between 0.5 and 4 hours.

4. A process as claimed in claim 1, wherein the graphite is natural graphite.

5. A process as claimed in claim 1, wherein the graphene is in the form of graphene nanosheets or graphene nanodots.

6. A process as claimed in claim 5, wherein the graphene nanosheets comprise 2 to 4 layers of graphene.

7. A process as claimed in claim 5, wherein the graphene nanodots have a height of 1 to 3 nm.

8. A process as claimed in claim 5, wherein the graphene nanodots have a diameter of less than 10 nm.

9. A process as claimed in claim 1, wherein the ionic liquid comprises an organic salt containing one more cations selected from the group consisting of ammonium, imidazolium and pyridinium ions.

10. A process as claimed in claim 9, wherein the organic salt contains an imidazolium ion.

11. A process as claimed in claim 10, wherein the ionic liquid is 1-butyl-3-methyl-imidazolium hexafluorophosphate.

12. A process as claimed in claim 1, wherein the oxygen content of the graphene is less than 5 at %.

13. A process as claimed in claim 1, wherein the process does not include the use of a reducing agent or an oxidising agent.

14. A process as claimed in claim 1 further comprising separating the ionic liquid from the graphene.

15. A process as claimed in claim 14 further comprising separating the ionic liquid from the graphene by means of addition of a solvent followed by centrifugation.

* * * * *